(12) United States Patent
Paiam

(10) Patent No.: US 6,449,404 B1
(45) Date of Patent: Sep. 10, 2002

(54) OPTICAL SWITCH

(75) Inventor: Reza Paiam, Ottawa (CA)

(73) Assignee: JDS Uniphase Corporation, Ottawa ( * ) Notice: Subject to any disclaimer, the term of this patent is extended or adjusted under 35 U.S.C. 154(b) by 0 days.

(21) Appl. No.: 09/559,066

(22) Filed: Apr. 28, 2000

(30) Foreign Application Priority Data

Apr. 30, 1999 (CA) .............................................. 2271159

(51) Int. Cl.$^7$ ................................................. G02B 6/26
(52) U.S. Cl. ........................... 385/16; 385/132; 385/14; 385/21; 385/8
(58) Field of Search ........................... 385/132, 14, 21, 385/8, 9, 16

(56) References Cited

U.S. PATENT DOCUMENTS 4,127,320 A * 11/1978 Li
5,371,812 A * 12/1994 Nakamura
5,532,867 A * 7/1996 Hayes et al.
6,215,918 B1 * 4/2001 Keil et al.

* cited by examiner

Primary Examiner—Hung N. Ngo
(74) Attorney, Agent, or Firm—Neil Teitelbaum (57) ABSTRACT

An optical switch is disclosed which operates as binary or digital switch. Two glass waveguides are arranged in an X-like pattern such that they approach each other at a waist region without crossing over one another. A polymer region contacts both waveguides at this waist region and has a refractive index that can be changed more than that of the adjacent glass by applying heat. The refractive index of the polymer can be varied from an index which is same as the glass waveguides; to be less than that of the glass in which case the polymer acts as a cladding. When the index of the polymer is lower than that of the glass through the application of heat, light launched into one of the waveguides continues along the waveguide via total internal reflection and no light crosses the glass polymer boundary. When the index of the polymer is the same as the glass light propagates through the polymer from the first waveguide and crosses the polymer boundary so that switching occurs from the first waveguide to the second.

19 Claims, 6 Drawing Sheets

1
Core
Lower cladding
substrate

Fig. 1

2
Metal mask
grafting parts

Fig. 2

3
Grafting parts

Fig. 3

4
Stack with
grafting parts

Fig. 4

5
Metal mask
waveguide

Fig. 5

6
Waveguide with
grafting parts

Fig. 6

7
Upper cladding

Fig. 7

1
Core
Lower cladding
substrate

Fig. 8

2
Metal mask
grafting gaps

Fig. 9

3
Gaps for
grafting

Fig. 10

4
Upper cladding

OPTICAL SWITCH

FIELD OF THE INVENTION

This invention relates to optical switches and in particular to an optical switch having a plurality of switching positions.

BACKGROUND OF THE INVENTION

In optical communication systems it is often necessary to switch an optical signal between different optical paths, be it along an optical waveguide such as an optical fiber, or in free space. Optical switching devices may generally be classified into moving-beam switches and moving-fiber switches. Moving-beam switches redirect the optical signal path between stationary waveguides or in free space. Moving-fiber switches physically change the location of optical fibers to be switched.

Different categories of optical switches for switching optical signals include electrical switches, solid-state switches, mechanical switches, and optical switches and combinations therebetween.

Electrical switches convert an optical signal to an electrical signal and then switch the electrical signal by conventional switching techniques. Electrical switches then convert the electrical signal back into an optical signal. Electrical switches are faster then existing mechanical switches but are also significantly more expensive. Furthermore, electrical switching of optical signals is bandwidth limited since a converted electrical signal can not carry all the information in an optical signal. This bandwidth limitation of electrical switches severely limits the advantages of using fiber optics.

Solid-state optical switches have fast switching speeds and the same bandwidth capacity as fiber optics. However, the cost for solid-state optical switches is 30 to 100 times more than those for existing mechanical switches. Another disadvantage of solid-state optical switches is that they incur insertion losses exceeding 20 times those for existing mechanical optical switches.

Mechanical optical switches are typically lower in cost than electrical or solid-state optical switches, provide low insertion loss, and are compatible with the bandwidth of fiber optics The activation mechanism used in the optical deflection switch of the present invention is a moving-beam switch mechanism.

An exemplary optical fiber switch that utilizes a moving mirror to perform the switching function is disclosed by Levinson in U.S. Pat. No. 4,580,873 issued Apr. 8, 1986 which is incorporated herein by reference. Although this invention appears to adequately perform its intended function, it is believed too costly and somewhat complex.

There have been several designs of optical deflection switches using Frustrated Total Internal Reflection (FTIR) to accomplish switching or modulation of an optical signal. In almost all cases these systems begin with air gap which produces total internal reflection, and then rapidly drives the material to less than one tenth wavelength spacing to produce frustrated total internal reflection. Such systems are disclosed in U.S. Pat. Nos. 4,249,814; 3,649,105; 3,559,101; 3,376,092; 3,338,656; 2,997,922; and 2,565,514. In all of these systems there is a problem in overcoming friction and damage to the glass.

Another exemplary moving-beam optical switch that redirects the optical signal path between stationary waveguides is disclosed in U.S. Pat. No. 5,444,801 to Laughlin incorporated herein by reference. The invention described therein teaches an apparatus for switching an optical signal from an input optical fiber to one of a plurality of output optical fibers. This apparatus includes means for changing the angle of the collimated beam with respect to the reference so that the output optical signal is focused on one of the plurality of output optical fibers. Similar mechanical optical switches are disclosed in U.S. Pat. Nos. 5,647,033; 5,875,271; 5,959,756; 5,555,558; 5,841,916; and 5,566,260 to Laughlin incorporated herein by reference.

Laughlin teaches switching of optical signals between input fibers and output fibers through shifting of one or more virtual axis of the system by changing the position of a second reflector between multiple positions. This second reflector has a wedge shape to change the angle of the collimated beam by a selected amount to direct the beam to different output locations. However, the output locations are all lying along a diameter in the output focal plane of the GRIN lens as shown in FIG. 1.

Another optical switch based on total internal reflection is described in U.S. Pat. No. 4,988,157 in the name of Jackel et al. issued January 1991. This patent teaches the use of changing the refractive index of a region by providing electrodes positioned adjacent slots which are selectively activated to electrolytically convert the fluid to gaseous bubbles, thereby destroying the index matching across the slot and causing light to be reflected by the slot rather than propagating across the slot. In the presence of a catalyst, a pulse of opposite polarity or of sufficient size and of the same polarity will destroy the bubble. Although Jackel's invention appears to achieve its intended function, it is complex and costly to manufacture.

As of late, monolithic waveguiding devices have gained popularity. These devices tend to be compact and cost effective to manufacture. Such devices are described by the applicant in U.S. Pat. No. 5,470,692 entitled Integrated optic components issued Nov. 28, 1995. In the '692 patent an integrated optic component comprises a substrate carrying a layer of polymeric material. The component may be poled so as to be an active component and may be in the form of a ridge guide.

Many monolithic devices having, for example polymer waveguides disposed therein provide a single guided mode, similar to single mode optical fibre. Another class of monolithic waveguiding devices are comprised of waveguides disposed in glass wherein an ion diffused region or a reactive-ion-etched structure overcoated with a cladding can serve as a waveguide core.

Polymer waveguides disposed on a substrate offer some advantages over inorganic glass such as silica, however, low levels of signal loss i.e. high transparency of inorganic glass is desirable and preferred to polymer. Polymer waveguides are noted for low transparency, i.e. significant loss; polymer waveguides have a high co-efficient of expansion and, associated with that a high (negative) thermo-optic co-efficient, and a low thermal conductivity. In contrast, inorganic glass has a high transparency, a high thermal conductivity, and a low (positive) thermo-optic coefficient.

This invention utilizes these differences in the two materials in a synergistic manner by providing an inorganic glass/polymer hybrid core structure that highly advantageous.

Typically, optical fibers comprise a light-carrying core, for example an inorganic glass such as fused silica or a polymer such as polymethyl methacrylate, and a cladding material having a lower refractive index than the core. The cladding material serves to confine the light energy within the core and thereby allows propagation of light by a phenomenon generally known as "total internal reflection."

It is an object of this invention, to provide a waveguide that uses the beneficial characteristics of inorganic glass such as silica, and as well the beneficial characteristics of polymer waveguides, while minimizing the unwanted characteristics of these materials.

For example, it is desired to have a optical waveguide with an active region which is highly thermo-optic active, so that it may be switched, or modulated with low power. Notwithstanding, it is desired to have an optical waveguide that under normal transmission is highly transparent, i.e. has little signal power loss. Yet still further, it is desired to have a waveguide wherein the refractive index can be changed relatively efficiently and significantly with minimal power. And yet still further, it is desired to have a waveguide with two different regions, having guided light transmitting cores that have relatively different refractive indices, yet that can be modified by the application of a suitable energy, to increase the refractive index difference between the two regions.

It is an object of this invention, to provide a waveguide that uses the beneficial characteristics of inorganic glass such as silica, and as well the beneficial characteristics of polymer waveguides, while minimizing the unwanted characteristics of these materials.

It is an object of this invention to provide an optical switch that requires low power.

SUMMARY OF THE INVENTION

In accordance with the invention there is provided, an optical switch comprising: a first waveguide having a first core of a first material having a first input end and a first output end; and a second waveguide having a second core of the first material having second input end and a second output end, the first input end being spaced from the second input end by a distance $d_2$, and a coupling region between the first input end and the first output end, wherein the first and second waveguide cores are very closely spaced by a distance $d_1$, wherein $d_1 \ll d_2$; and a second material contacting the first and second waveguide cores in the coupling region, the second material being different than the first material; and, means for providing a refractive index difference between the first and second materials to providing switching of light launched into one of the input ports.

In accordance with the invention there is further provided, an optical switch comprising two waveguides having separate cores that together form an X pattern, the cores being close together at an active region where they converge and the cores diverging outward therefrom, the cores having a region of a different material disposed therebetween and contacting therewith, and means for changing a refractive index difference between the different material region and the cores.

This invention is not limited to waveguides having a core of a particular shape, however this invention is related to waveguides formed of materials having different optical properties contiguously disposed one beside the other.

Instead of switching by thermal means as described in a preferred embodiment hereafter, switching can be achieved by applying a voltage to vary the refractive index if an electro-optic polymer is used, or compression may be used as a means of varying the polymers refractive index and providing an index difference between the polymer and adjacent glass region.

BRIEF DESCRIPTION OF THE DRAWINGS

Exemplary embodiments of the invention will now be described in conjunction with the drawings, in which.

DETAILED DESCRIPTION

Figure 1:
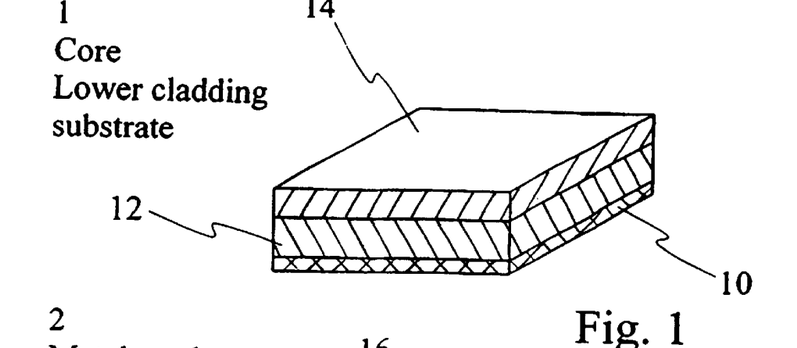
FIG. 1 an isometric view of a two-layered planar structure on a flat substrate serving as a base for fabricating a waveguide device.
Figure 2:
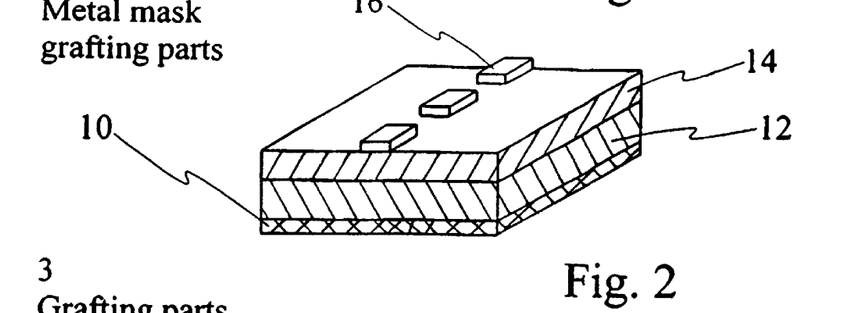
FIG. 2 is an isometric view of the device shown in FIG. 1 including a metal mask disposed atop an upper layer for use in providing grafted parts.
Figure 3:
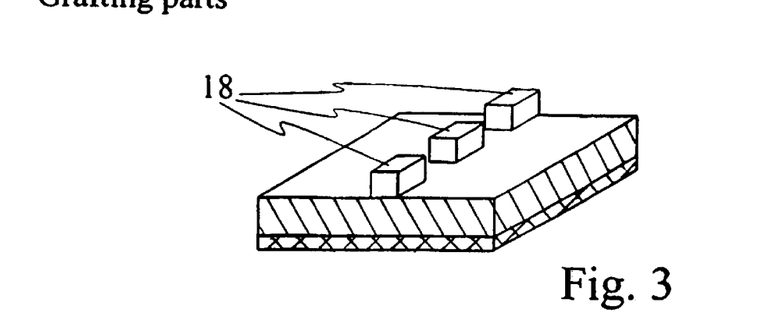
FIG. 3 is an isometric view of the device shown in FIG. 2 wherein three grafting parts are shown after removing unmasked material around the parts.
Figure 4:
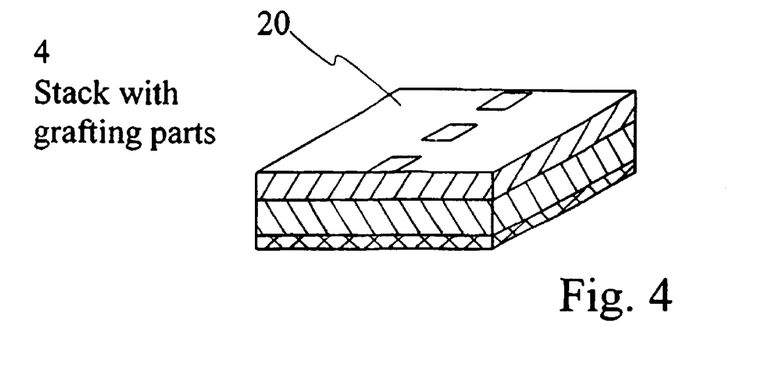
FIG. 4 is an isometric view of the device shown in FIG. 3 including an additional spin coated layer.
Figure 5:
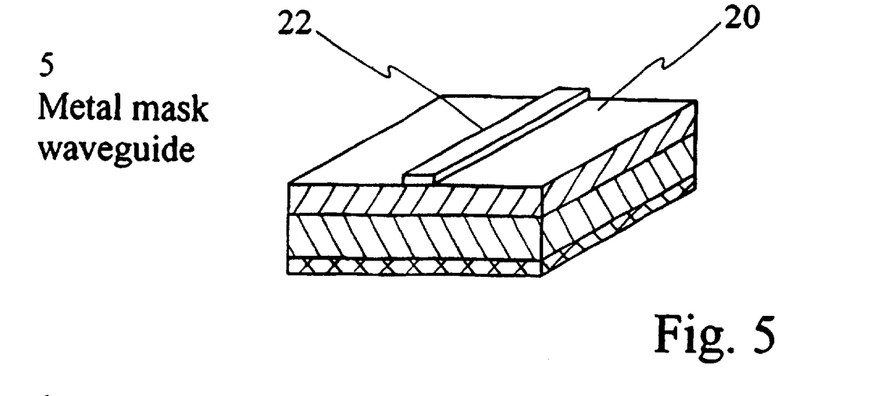
FIG. 5 is an isometric view of the device shown in FIG. 4 having a mask upon the grafting parts and adjacent polymer material for forming a longitudinal core section.
Figure 6:
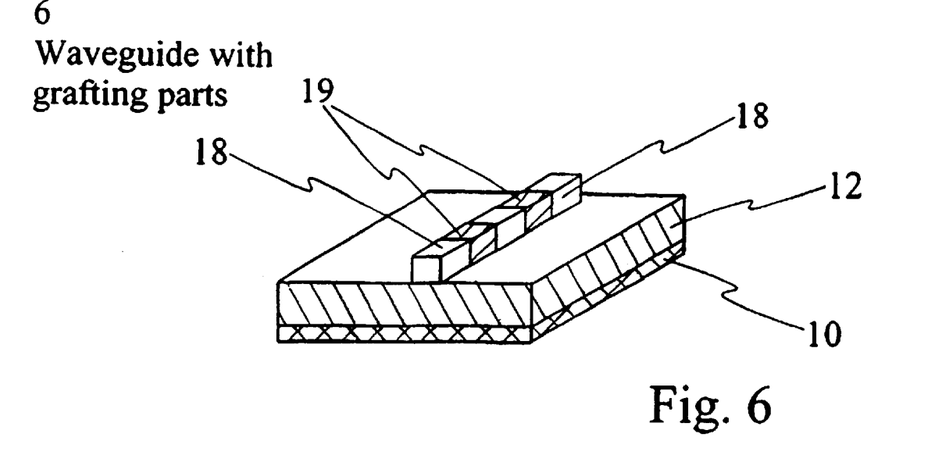
FIG. 6 is an isometric view of the device shown in FIG. 5, wherein the composite core with grafted sections are shown after removal of the unmasked surrounding material, awaiting a final upper cladding layer to be spin-coated thereon.
Figure 7:
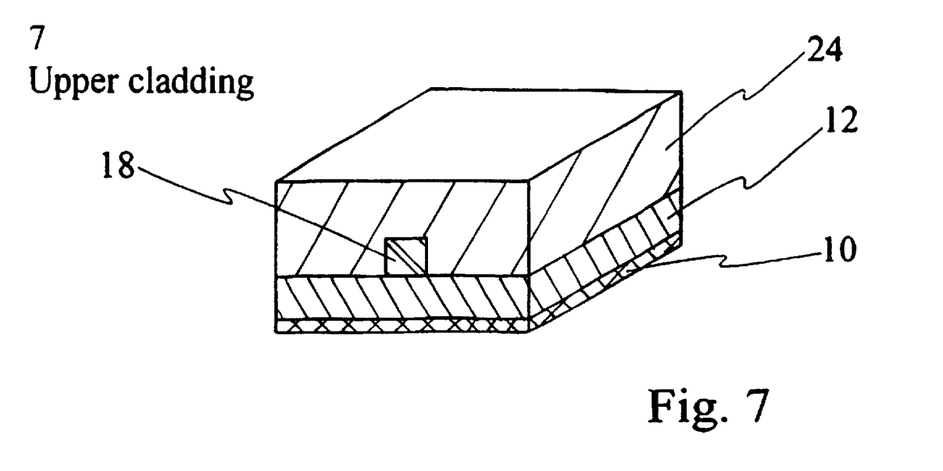
FIG. 7 is an isometric view of a waveguide device having a grafted core surrounded by a cladding.

The grafting of planar polymeric waveguides is known and is described in a publication entitled Novel "serially grafted" connection between functional and passive polymer waveguides, by Watanabe et al Appl. Phys. Lett. 65 (10), Sep. 5, 1994, pp. 1205–1207 The process steps required to create inlay-structures are shown in the figures and begin with spin-coating a lower cladding layer 12 onto a silicon substrate 10 followed by coating the core polymer 14 as is shown in FIG. 1. This core layer is used to create parts to be grafted. FIG. 2 illustrates the application metal structures 16 used as a mask for the grafting parts and realized onto lift off resist by evaporation of a metal layer, resist spinning and definition by photo-lithography. The grafting parts 18 are shown in FIG. 3 after reactive ion etching (RIE) to remove the unmasked core layer material. After a liftoff step to remove the metal mask, a second core layer 20 is spin coated. The remaining portion of the waveguide core is formed by this layer. Conventional etch-back planarization is performed to reach a flat surface. A planarization layer is spin-coated onto the second core layer 20 and then etched back until the preferred waveguide height is reached. The topography of the upper surface of the planarization layer is transferred to the underlying layer. In this manner a polymer stack with grafted parts and a flat surface is reached as shown in FIG. 4. After this, another metal structure 22 is defined onto lift-off resist, by evaporation of a metal layer, resist spinning and definition by photo-lithography with the final waveguide pattern as shown in FIG. 5. FIG. 6 illustrates the waveguide consisting of grafted parts 18, 19 after reactive ion etching. FIG. 7 illustrates the polymer stack after a final spin-coat 24 of upper cladding is applied.

Although optical devices made of two different polymer cores such as the grafted cores described heretofore are useful in certain optical applications, it is believed that this structure can greatly be improved upon.

This invention relates to the provision of an optical waveguide having a core wherein a region of the core is a polymer material and wherein an adjacent contiguous region of of the waveguide is inorganic glass preferably silica. Since silica is highly transparent, and less attenuating than polymer materials, it is preferable in most instances to manufacture devices wherein the core is substantially made of silica, and wherein a much smaller lesser portion is made of polymer. Furthermore, many of the benefits of polymer can be utilized by using only a small amount of polymer in these devices. For example in an active device such as an optical switch, the switching region itself can be realized with a small polymer grafted insert. In temperature stable devices, where the advantageous combination of combining a core of polymer with a core of silica is provided, the ratio of polymer to silica or glass is about 1:10, hence only a small amount of polymer is required in many instances in smaller devices. Polymer silica hybrid core waveguides as described hereafter are particularly suitable in optical switch or in-line Bragg grating applications for a plurality of reasons. Since a polymer silica core hybrid waveguide can be provided wherein the refractive index is the same at ambient temperature, or at a predetermined temperature, gratings can be manufactured which are substantially transmissive at a particular temperature and which are highly reflective at other higher temperatures for predetermined wavelengths of light. Hence such an optical waveguide would act as a reflective (or forward coupling) filter when heat is applied and would act as if the grating was absent when the heat was removed. Instead of the multiple polymer silica sections that are used in the gratings, a single polymer section would act as a wavelength insensitive reflector when heat is applied and would act as if the reflector was absent when the heat was removed.

Thus, practicable, useful active and passive optical devices can be made from the waveguides in accordance with this invention.

FIGS. 1 through 7 as shown relate to the formation of a hybrid grafted core section having two different polymer materials adjacent one another forming the core of the waveguide. This process can be extended to yield a hybrid silica/polymer core in accordance with this invention. Referring now to FIGS. 1 through 7 again, the initial base layers 12 and 14 are now made of silica; these layers can be created by flame hydrolysis deposition (FHD) process or a chemical vapour deposition (CVD) process; these layers precede polymer layers because they fabricated at temperatures well above the degradation temperature for polymers. Initially the lower silica cladding layer 12 is deposited onto the silicon substrate 10, followed by the silica core layer 14. This is illustrated in FIG. 1 Channel waveguide core sections will be etched out of the core layer by means of reactive ion etching (RIE) in $CHF_3$, Ar gas mixtures using a Cr mask. This mask 16 is created by Cr layer sputtering onto the core layer followed by standard photolithographic resist patterning and wet chemical etching. Hence openings for the polymer channels section to be disposed are provided as is illustrated in FIG. 2. After RIE, the mask is removed by a wet chemical etching process and the silica grafting parts 18 are ready for polymer overcoating as can be seen in FIG. 3.

This is illustrated in FIG. 4 where a solution of cross-linkable polymer for the core sections has been spin-coated onto the wafer to embed the remaining silica core sections 18 in the core polymer 20. Dependent on the polymer that is used, thermal or photocuring is used to make the polymer layer insoluble. Additional cured polymer layers can be deposited over this layer to further planarize the surface. The polymer surface is then etched down to the upper core surface using RIE with $O_2$. A continuous Ti mask pattern 22 for the hybrid channel waveguide is formed onto this surface by means of a standard photolithographic resist patterning followed by dry etching using RIE with $SF_6$. This is shown in FIG. 5 The Ti is evaporated onto a photoresist layer that is spincoated first onto the surface. FIG. 6 shows the continuous hybrid channel 18+19 that is created by polymer etching using $O_2$-RIE. The mask pattern is removed by a lift off procedure. Finally a polymer upper cladding layer 24 having a refractive index that is lower than the refractive index of the polymer core sections is spin-coated over the hybrid channel waveguide structure as illustrated in FIG. 7. After curing it forms an insoluble upper cladding layer. The final waveguide is formed of core sections of silica 18 and adjacent core sections 19 of polymer.

Figure 8:
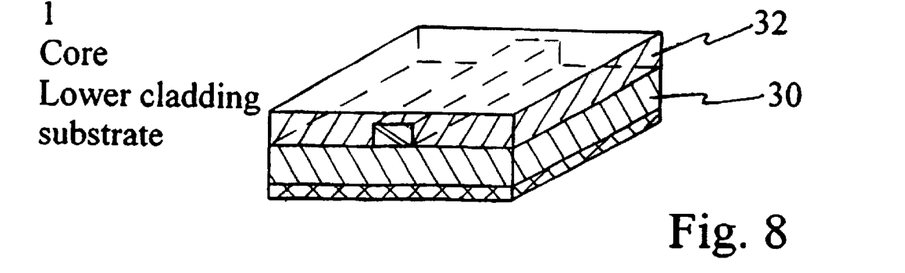
FIGS. 8 through 11 are isometric views of a grafting process for providing polymer core sections into a silica core waveguide.
Figure 9:
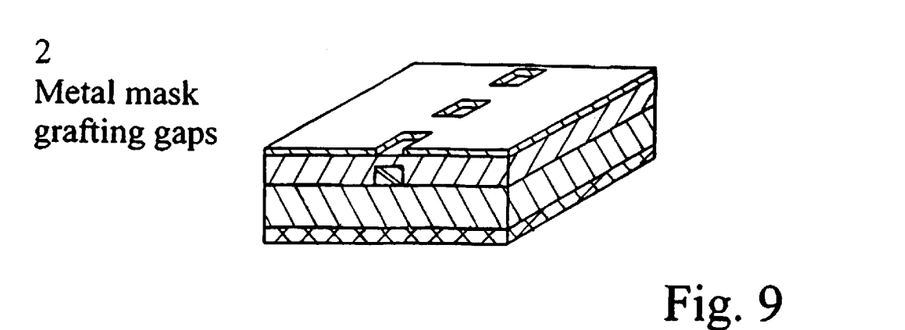
Figure 10:
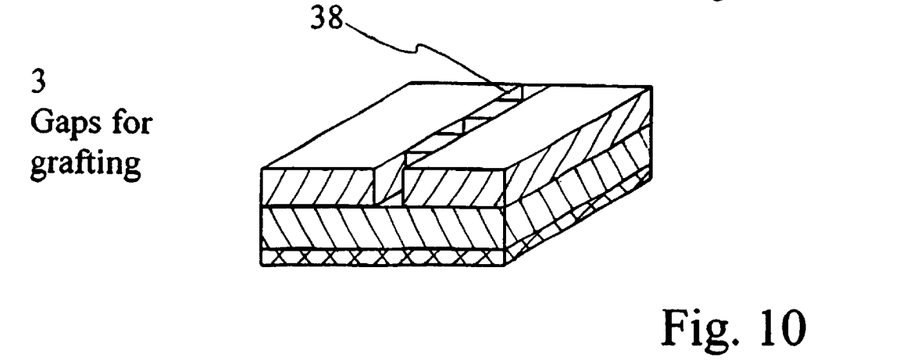
Figure 11:
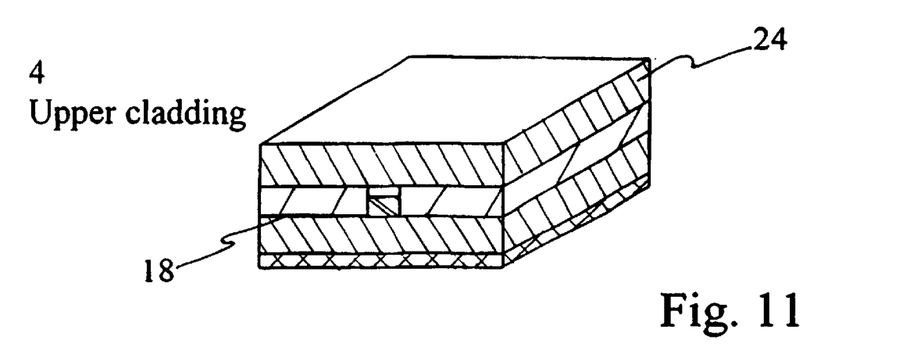

FIGS. 8 to 11 show an alternative process that begins from silica channel waveguides 34 including the upper silica cladding 32 (FIG. 8). Sections for the polymer core are provided by etching out the silica down to the lower silica cladding using a metal mask (FIG. 9) to make grafting gaps in the silica core by RIE (FIG. 10). The gaps are filled first with the core polymer by spincoating and curing. This polymer is then etched down by RIE with $O_2$ to the upper core interface. This process can be carried out without the use of a mask, because the silica is not etched in the RIE process for the polymer. A polymer cladding is applied thereafter (FIG. 11).

Figure 12A:
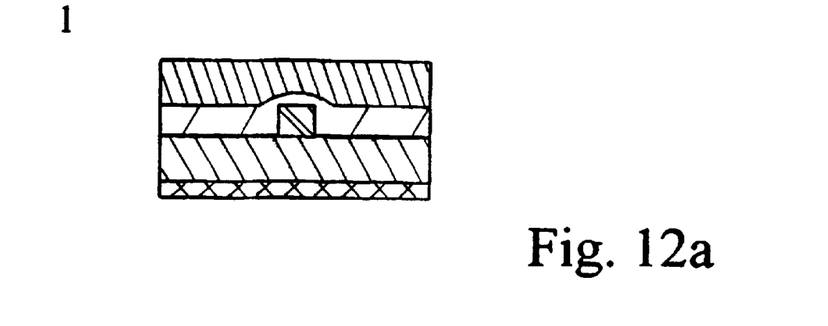
FIGS. 12a through 12d illustrate different etch back states.
Figure 12B:
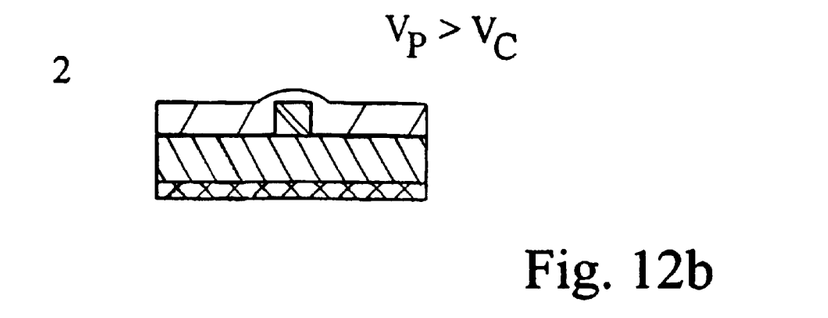
Figure 12C:
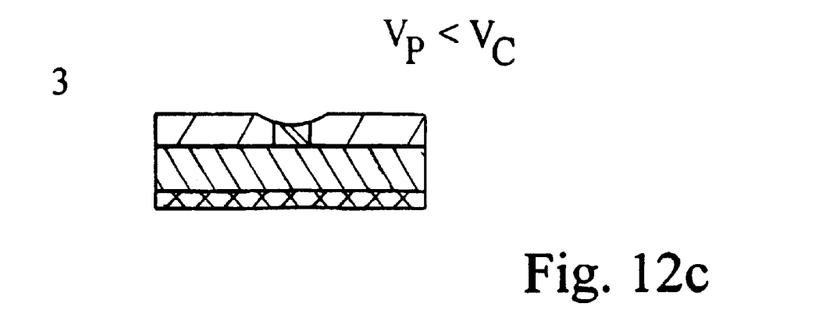
Figure 12D:
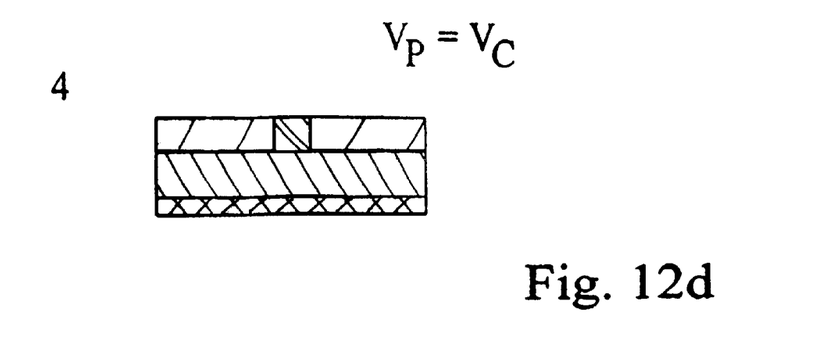

Referring now to FIGS. 12a through 12d the etch back principle is illustrated. To successfully etch back the planarization material has to have the same etch speed as the core or grafting material. The initial situation is a layer stack which is built up to the planarization layer as show in 12a. When the etch rate of the planarization material $v_p$ is larger than the etch rate of the core materials $v_c$ a bump will remain as illustrated in FIG. 12b. When the etch rate of the planarization material is smaller than the etch rate of the core material a dent can arise as shown in FIG. 12c. Preferably as shown in FIG. 12d, $v_p=v_c$.

Figure 13:
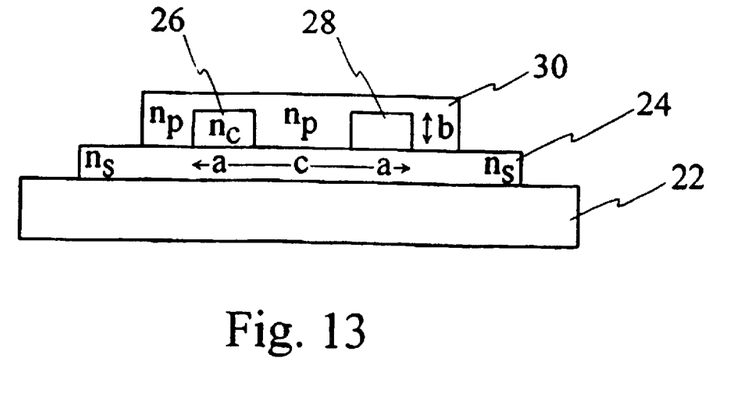
FIG. 13 is a cross sectional view from a prior art patent EP 07071 13A1 in the name of Bosc et al assigned to France Telecom wherein a planar waveguide is disclosed having silica core and a polymer cladding region.

FIG. 13 shows in a prior art European patent application EP 07971 13A1 in the name of Bosc et al. a planar waveguide having silica core and a polymer cladding region. Although there are advantages to such a structure, in contrast the instant invention provides a planar optical waveguide that provides an entirely new class of optical devices.

This invention provides control of and within the core of a waveguide itself. Hence by using these two very compatible materials having significantly different properties within a core of an optical waveguide, a host of new devices are practicable; devices which can route, switch, multiplex and modify channels or wavelengths of light; devices essential for optical communications. The core of the waveguide need not be confined to small dimension typically associated with single mode propagation of light; core dimensions may in fact be considerably larger, for example for use in applications such as multimode interference devices.

Figure 14:
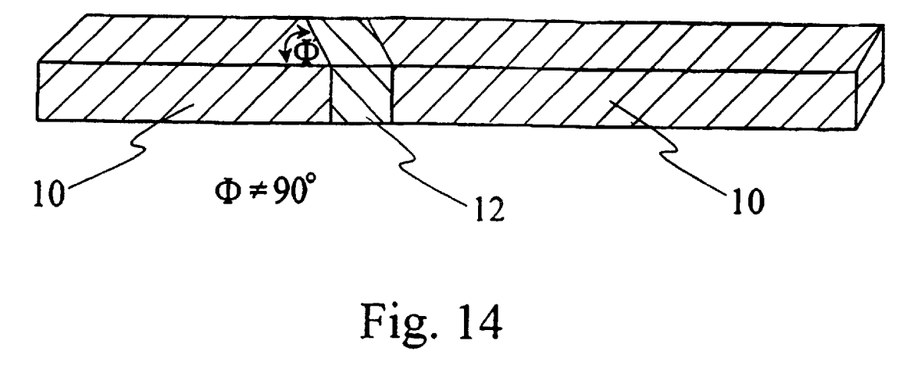
FIG. 14 is an isometric view of a hybrid core of an optical waveguide in accordance with an embodiment of the invention.
Figure 15:
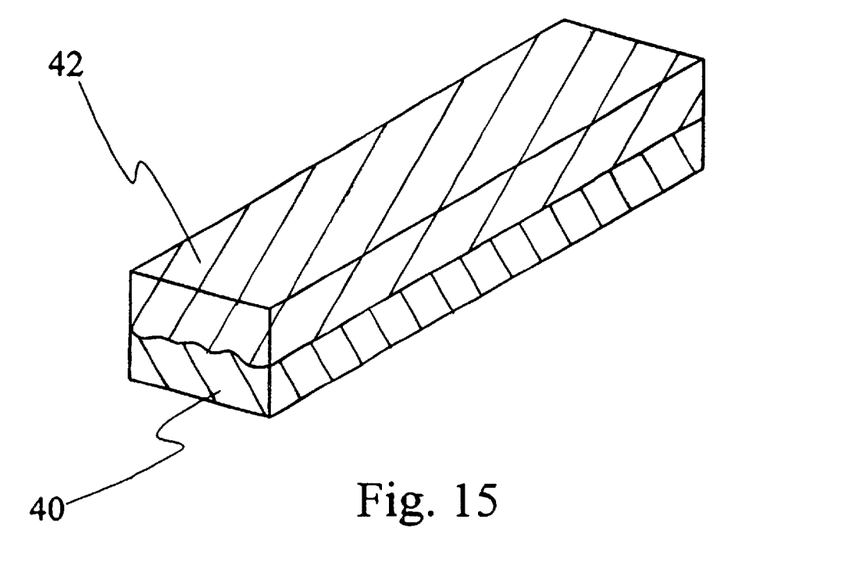
FIG. 15 is an isometric view of an alternative hybrid core of an optical waveguide.

Referring now to FIG. 14, a core of an optical waveguide is shown, in accordance with this invention, having a polymer portion 12, grafted between two silica sections 10. Of course a suitable cladding is required (not shown) around the waveguide core in FIG. 14 to ensure that light is confined within the core. Although the polymer portion 12 and silica sections 10 are adjacent and contiguous to one another in a longitudinal sense, serially one portion after the other, this invention is not confined to longitudinal contiguous sections or portions of silica and polymer within a core of a waveguide. For instance, in FIG. 15 a core is shown having two contiguous portions of silica 40 and polymer 42, wherein there are no longitudinal abutting portions.

Multi-mode interference couplers are well known and are described in the following text: L. B. Soldano and E. C. M. Pennings, Optical multi-mode interference devices based on self-imaging: principles and applications, J. Lightwave Technolgy. 13 (4), 615–627 (1995).

Figure 16:
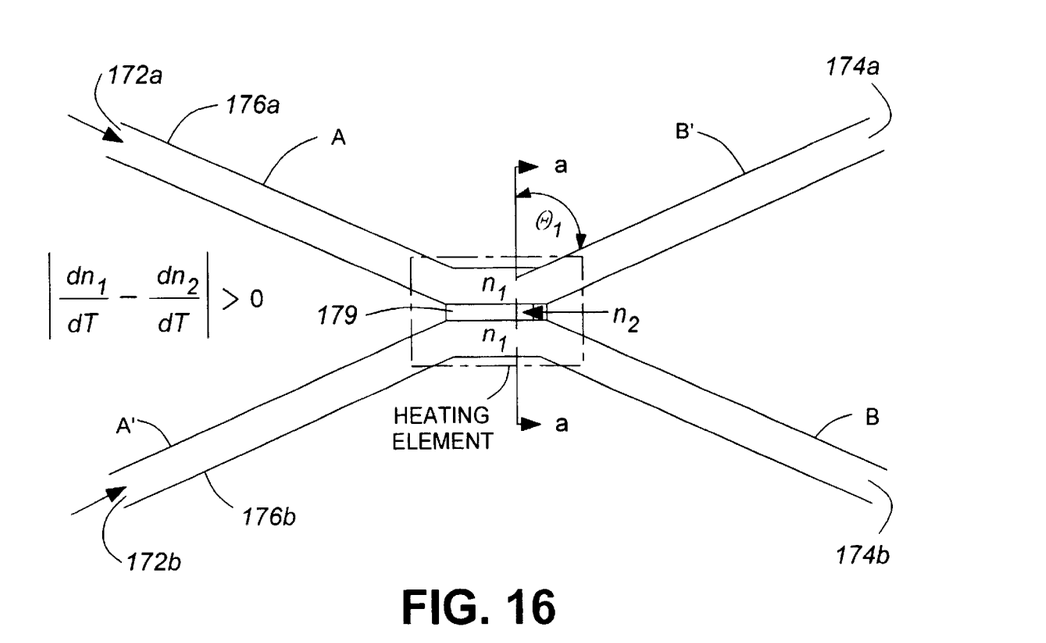
FIG. 16 is a top view of an optical switch in accordance with a preferred embodiment of the invention; and, FIG. 17 is a cross sectional view of the optical switch shown in FIG. 17 taken along the line a–a' in accordance with a preferred embodiment of the invention.

Turning now to FIG. 16, an optical switch is shown having two optical waveguides 176a and 176b having input ends 172a 172b and output ends 174a and 174b. A cladding layer 178 having a refractive index $n_{c1}$, lower than the refractive index $n_1$ of the waveguide cores is applied over the cores and over a mid-region. The mid-region is shown as a dotted rectangle and includes glass waveguides 176a and 176b as well as a thin region of a different material such as polymer 179. Since the switch is bi-directional, input ends may serve as output ends and output ends as input ends. When heat is applied by a heating element 180 in an active region defined by the dashed line indicating the heating element, the refractive index difference between the polymer and the glass within the mid-region increases. In the absence of heat, the refractive index of the polymer is the same as the refractive index of the glass and so that the refractive index difference between $n_1$ and $n_2$ is zero. It is preferred to have the mid-region as small as possible while maintaining the mode field of the cores. Thus, the horizontal second material layer shown in the mid-region is made as narrow as possible. At the same time, it is preferred that the waveguide A be in line with the waveguide section B and that the waveguide section A' be in line with the waveguide section B'.

Total internal reflection ensures that light launched into end 172a will propagate within waveguide 176a and will continue along 176a until it reaches the output port 174a. For this to occur, the polymer region 179 has to be of a refractive index $n_2$, wherein $\sin \theta_1 > n2/n1$. Of course once the geometry of the X-pattern is established, switching from one path to another is accomplished by varying the refractive index difference between the polymer and the glass waveguide.

The circuit is preferably designed such that when no heat is applied, at ambient temperature, the polymer has the same refractive index as the waveguide core and light launched along A couples into B. In the presence of heat, light launched into A remains within the same waveguide and couples into B'. In this instance the refractive index of the polymer is less than that of glass and through total internal reflection light remains in waveguide 176a. In this mode light can be launched into both ends 172a and 172b simultaneously and will be simultaneously be output at ends 174a and 174b respectively.

Since the switch is a binary switch having a switched or unswitched state, according to Snell's law, when the conditions for total internal reflection apply the switch will be in one of two switching states, and when the conditions do not apply the switch will be in the other of the two switching states.

Of course the optical switch can be used as a two-state modulator.

Figure 17:
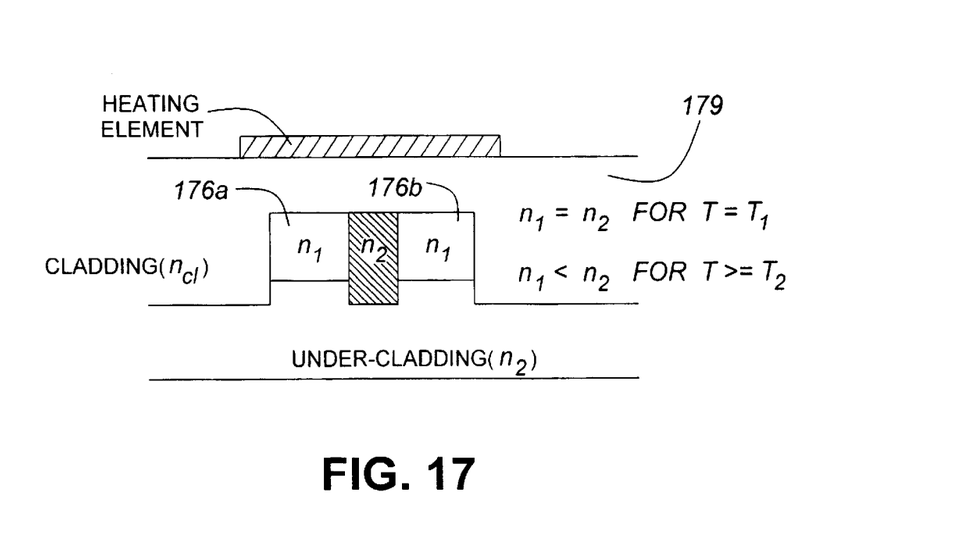

FIG. 17 shows a cross-section of the switch at the mid-region. A top cladding is shown having a heating element over top and having an undercladding support layer.

What is claimed is:

1. An optical switch comprising a first waveguide having a first core of a first material having a first input end and a first output end;

and a second waveguide having a second core of the first material having second input end and a second output end, the first input end being spaced from the second input end by a distance $d_2$, and a coupling region between the first input end and the first output end, wherein the first and second waveguide cores are very closely spaced by a distance $d_1$, wherein $d_1 \ll d_2$; and a second material contacting the first and second waveguide cores in the coupling region, the second material being different than the first material; and, means for providing a refractive index difference between the first and second materials to providing switching of light launched into one of the input ports.

2. An optical switch as defined in claim 1 wherein the first material has a refractive index $n_1$ and wherein the second material has a refractive index that is variable between $n_1$ and $n_2$.

3. An optical switch as defined in claim 2 wherein light launched into the first waveguide input end propagates through the first core to the output end of the first waveguide in a first non-switched mode of operation, and wherein light launched into the first waveguide input end propagates through the first core to the output end of the second waveguide in a second switched mode of operation.

4. An optical switch as defined in claim 3 wherein the refractive index of the second material is $n_2$ in the first non-switched mode of operation, and wherein the refractive index of the second material is $n_1$ in the second switched mode of operation, and wherein $n_1 > n_2$.

5. An optical switch as defined in claim 4 wherein a beam launched into the first port is reflected via total internal reflection at a boundary of the first and second material in the non-switched mode of operation, and wherein the beam propagates through the boundary in the absence of total internal reflection at boundary of the first material and the second material in the switched mode of operation.

6. An optical switch as defined in claim 5, wherein the first waveguide core has two substantially longitudinal linear sections having intersecting longitudinal axes, and wherein the second waveguide core has two substantially longitudinal linear sections having intersecting longitudinal axes.

7. An optical switch as defined in claim 6, wherein one of two substantially longitudinal linear sections of the first core and one of the two substantially longitudinal linear sections of the second core lie along a common longitudinal axis.

8. An optical switch as defined in claim 7, wherein the other of the two substantially longitudinal linear sections of the first core and the other of the two substantially longitudinal linear sections of the second core lie along a common longitudinal axis.

9. An optical switch as defined in claim 2, wherein the first core and the second core and the second material contacting the first and second waveguide cores in the coupling region are clad with a cladding.

10. An optical switch as defined in claim 9, wherein the cladding has a refractive index $n_3<n_1$.

11. An optical switch as defined in claim 10, wherein said means for providing a refractive index difference is a heater.

12. An optical switch as defined in claim 11 wherein the refractive index of the waveguide cores is substantially equal to the refractive index of the polymer region in the absence of said means for applying a refractive index difference.

13. An optical switch comprising two waveguides having separate cores that together form an X pattern, the cores being close together at an active region where they converge and the cores diverging outward therefrom, the cores having a region of a different material disposed therebetween and contacting therewith in the active region, and means for changing a refractive index difference between the different material region and the cores.

14. An optical switch as defined in claim 13 wherein the different material is polymer and wherein the cores and the polymer have a cladding.

15. An optical switch as defined in claim 14 wherein the cores are comprised of glass and the cladding is a common cladding to the polymer and the cores.

16. An optical switch as defined in claim 15 wherein the means for changing the refractive index is a heater.

17. An optical switch as defined in claim 16 wherein the means for changing the refractive index is an applied voltage and wherein the polymer has a refractive index that is electro-optically variable.

18. An optical switch as defined in claim 15 wherein light launched into one of the waveguide cores is transferred to the other core when the refractive index of the polymer is substantially equal to the refractive index of the cores.

19. An optical switch as defined in claim 18 wherein the light launched into one of the waveguide cores propagated through the core without coupling into the other core in a second mode of operation when the refractive index difference between the polymer and the cores is substantially different such that total internal refection occurs within the active region.

* * * * *